Figure 1:
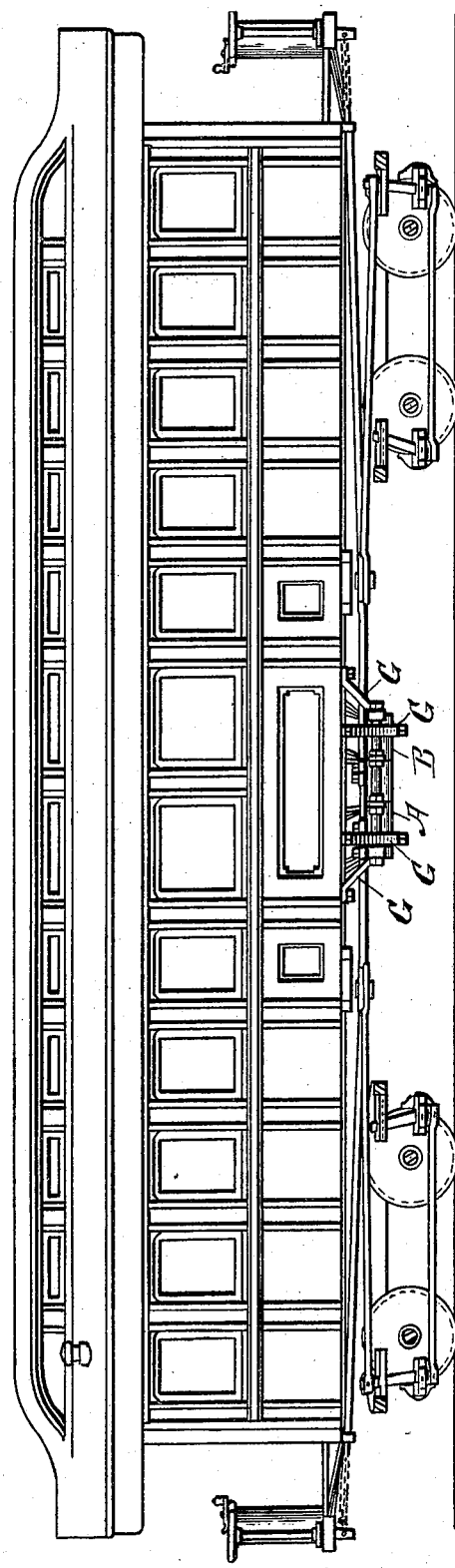

No. 670,415. Patented Mar. 26, 1901.
G. D. BURTON.
ELECTRICALLY OPERATED BRAKE.
(Application filed Apr. 13, 1899. Renewed Aug. 13, 1900.)
(No Model.) 3 Sheets—Sheet 1.

WITNESSES
E. K. Philipson
John F. Wood

INVENTOR
Geo. D. Burton

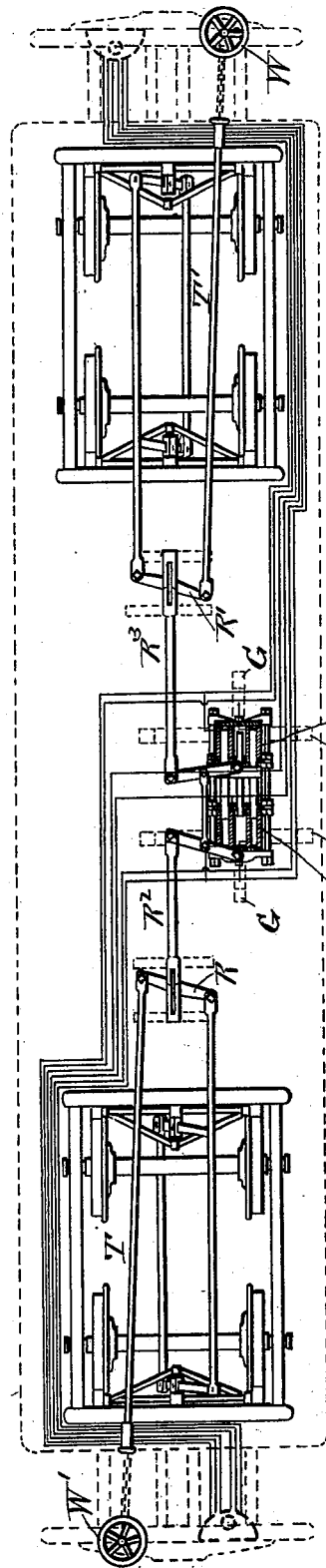

No. 670,415. Patented Mar. 26, 1901.
G. D. BURTON.
ELECTRICALLY OPERATED BRAKE.
(Application filed Apr. 13, 1899. Renewed Aug. 13, 1900.)
(No Model.) 3 Sheets—Sheet 3.
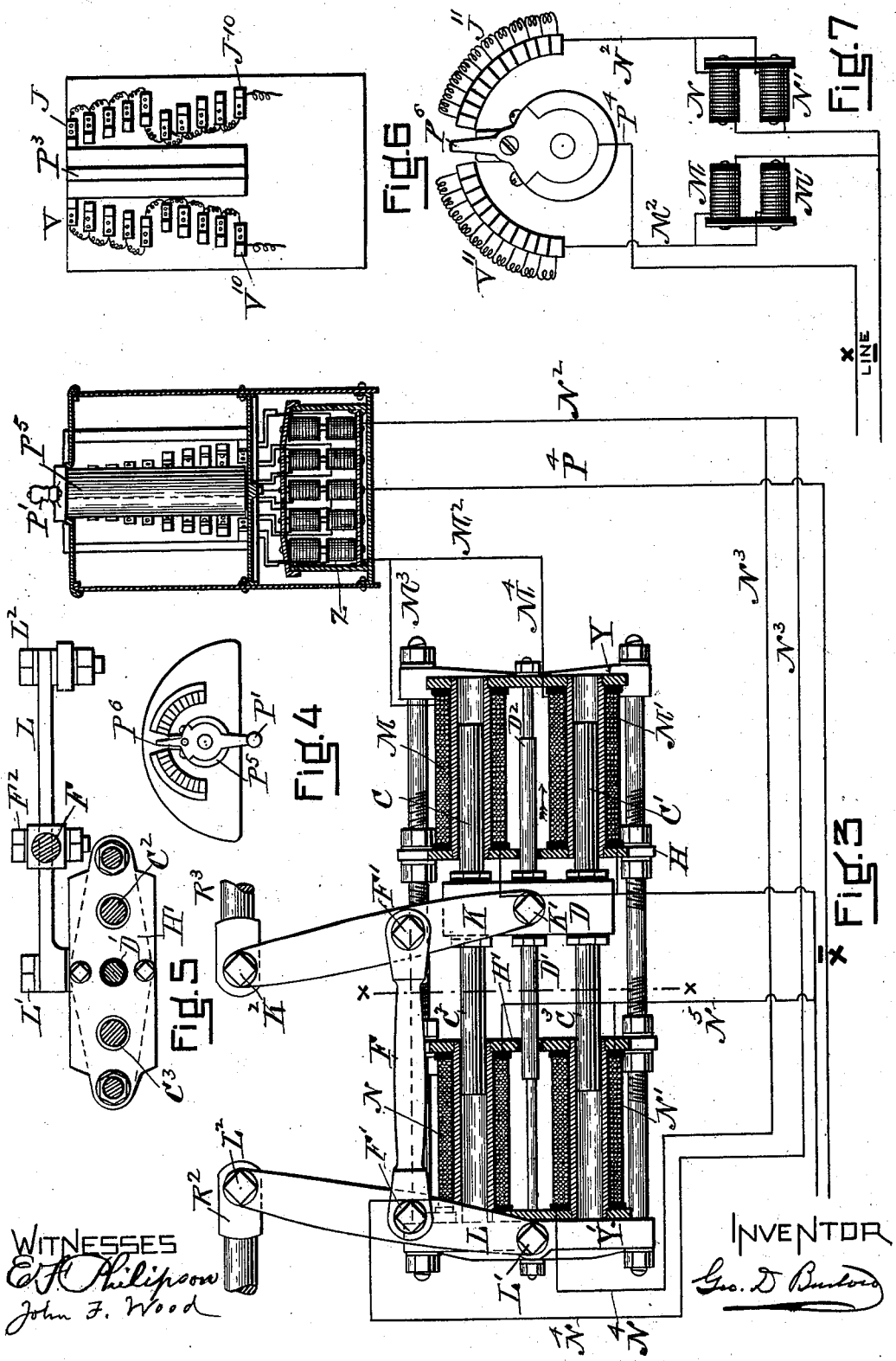
WITNESSES
INVENTOR

UNITED STATES PATENT OFFICE.

GEORGE D. BURTON, OF BOSTON, MASSACHUSETTS.

ELECTRICALLY-OPERATED BRAKE.

SPECIFICATION forming part of Letters Patent No. 670,415, dated March 26, 1901.

Application filed April 13, 1899. Renewed August 13, 1900. Serial No. 26,804. (No model.)

*To all whom it may concern:*

Be it known that I, GEORGE D. BURTON, of Boston, in the county of Suffolk and State of Massachusetts, have invented a new and useful Improvement in Electrically - Operated Brakes, of which the following, taken in connection with the accompanying drawings, is a specification.

This invention relates to electrically-operated brakes for vehicles.

The object of the invention is to secure absolute control of the brake by electricity, including both the applying and releasing thereof, whereby economy of power and safety are secured.

Figure 1 shows an ordinary passenger-car in side elevation, the wheels of one side not shown, whereby the brake device is more fully exhibited. Fig. 2 is a plan showing the running-gear and brake device and in a general way the electrical circuits. Fig. 3 is an illustration, partly diagrammatical, showing the device for electrically operating the brakes, partly in horizontal section and partly in plan, also showing in vertical section the interior of the controller. Fig. 4 is a plan of the controller. Fig. 5 is a cross-section taken on line X X of Fig. 3. Fig. 6 illustrates by development the arrangement of the contact-springs of the controller. Fig. 7 is a diagram illustrating the method of wiring my apparatus.

In the drawings, Fig. 1, a passenger-car is shown in elevation with parts of its running-gear and brake arrangement. A and B indicate in a general way the electric device for operating the brakes. The braces and hangers by which the electrical devices are attached to the car are indicated by G G.

In Fig. 2 various parts of the running-gear are shown in plan; also, the brake hand-wheels W and W', the brake-rods T and T', equalizing-levers R R', draft-rods $R^2$ and $R^3$, and electric device A B.

As the car, its running-gear, and brake mechanism may be of any construction I will not describe them in detail, but will confine the description to the parts that are new.

In Fig. 3, M M' represent a pair of hollow coils of magnet-wire, usually designated "solenoids," arranged to work in unison upon the soft-iron pistons C C'. N and N' represent a similar pair of coils adapted to operate the pistons $C^2 C^3$. All of the pistons C C' $C^2 C^3$ are connected to a common cross-head D. This cross-head is steadied in its front and back movements by the rods D' $D^2$, sliding in openings made in the head-pieces H H' and insulated from them. The coils M M' N N' are held firmly together by the side rods E E', the head-pieces H H', and the yokes Y Y', and suitable screw-nuts, as shown in Fig. 3. The coils are protected by suitable casings and the whole supported by hangers G G, Figs. 1 and 2. The pistons C and $C^2$ may be treated as a single piston having its opposite ends in the solenoids M and N, which are disposed apart from and preferably in line with each other, and likewise the pistons C' and $C^3$ may be treated as a single piston, having its opposite ends in the solenoids M' and N', which are also disposed apart from and preferably in line with each other.

The draft-rods $R^2$ and $R^3$, that operate the brakes, are respectively connected to the levers K and L by pivot-bolts $K^2 L^2$. The lever L swings on a fixed pivot L' on the yoke Y', but the lever K swings on a movable pivot K' on the reciprocating cross-head D. The two levers L and K are connected together by the link F, attached by pivot-bolts F' and $F^2$. Inspection of Fig. 3 will show that any movement of the cross-head D will cause a movement of the levers K and L. Thus if the cross-head moves in the direction of the arrow the levers K and L will move in a manner to draw the draft-rods $R^2$ and $R^3$ toward each other, and thus apply the brakes; but if the cross-head D is drawn by the coils N N' in a direction against that of the arrow then the levers L and K will push the rods $R^2 R^3$ apart, so as to throw off the brakes. By energizing the coils M M' the cross-head D is moved in the direction of the arrow and by energizing the coils N N' the cross-head D will be drawn toward the coils N N' and against the direction of the arrow—that is, by energizing the coils M M' the brakes are applied and by energizing the coils N N' the brakes are let off. This arrangement secures a positive control of the brakes by the electric current, both for applying and releasing them, and avoids the waste of power. In brakes where a spring is used for releasing them the force of the spring has to be overcome before the brakes can be applied, and this constitutes considerable loss of power throughout a train. By using the electric control in both directions the movement is prompt both ways and greater safety is thereby secured.

The controller (see Figs. 3 and 4) consists of a central semirotating cylinder P$^5$, having a handle P', a pointer P$^6$, and an electrode or contact-bar P$^3$, extending from the upper to the lower end of the cylinder P$^5$ and connected to one pole of the generator. Two series of contact-springs are shown in Fig. 3, also in development in Fig. 6. One of these series, V V$^{10}$, is connected through the resistance to the coils M M' and the other series, J J$^{10}$, to the coils N N'. Sets of resistance-coils are indicated at Z. These are connected in the usual manner to the contacts and translating devices.

The system of wiring is illustrated in Fig. 3 and in diagram, Fig. 7. P$^3$ represents the contact-bar, which is attached to the cylinder P$^5$ and indicated in elevation in Fig. 6. J$^{11}$ and V$^{11}$ are series of contact-springs. (Shown in elevation in Fig. 6 and marked J J$^{10}$ V V$^{10}$.) The wire P$^4$ connects the contact-bar P$^3$ to the line +. The wires N$^2$, N$^3$, N$^4$, and N$^5$, including the coils N N', connect the contact-springs J J$^{10}$ with the line —. The wires M$^2$ M$^3$ M$^4$ M$^5$, including the coils M M', connect the contact-spring V V$^{10}$ also with the line —, so that by turning the cylinder P$^5$ to the right electric connection is made with the solenoids M M', causing the cores C and C' to be drawn in, thus applying the brakes, and by turning the cylinder to the left electric connection is made with the coils N N', causing the cores C$^2$ C$^3$ to be drawn in, thus letting off the brakes.

This device may be applied to any railroad-car or other vehicle. The solenoids are here shown and described in pairs of two sets, but in light work only one pair may be used. The solenoids may be wound in any of the approved methods. The following has proved very effective: Use No. 20 doubly-insulated magnet-wire, wind twenty-three layers, each layer having two hundred and ninety-three turns, making six thousand seven hundred and thirty-nine total number of turns. In this case the weight of wire used is nineteen pounds and seven ounces, admitting a sufficient current to sustain two hundred pounds. Any suitable source of electricity may be employed to operate the solenoids.

I claim—

1. In an electric brake, the combination of a brake mechanism, a sliding cross-head connected therewith, pistons extending in opposite directions from said cross-head, solenoids surrounding said pistons and adapted to pull said cross-head in opposite directions respectively and means for energizing said solenoids alternately for applying and releasing the brakes.

2. In an electric brake, the combination of two solenoids disposed apart from each other, a piston having its opposite ends extending into said solenoids, two levers fulcrumed at corresponding ends, one to said piston between said solenoids and the other to a stationary pivot, a link connecting said levers, brake mechanism connected to the opposite ends of said levers, and means for energizing said solenoids alternately for applying or releasing the brakes.

3. In an electric brake, the combination of two series of solenoids disposed in pairs, the solenoids of each pair being apart from each other, pistons having their opposite ends disposed in said solenoids, a cross-head connecting said pistons between the series of solenoids, two levers fulcrumed at corresponding ends, one to said cross-head and the other to a stationary pivot, a link connecting said levers, brake mechanism connected to the opposite ends of said levers, and means for energizing each series of solenoids alternately for applying or releasing the brakes.

4. In an electric brake, the combination of two solenoids disposed apart from each other, a piston having its opposite ends extending into said solenoids, two levers fulcrumed at corresponding ends, one to said piston between said solenoids and the other to a stationary pivot, a link connecting said levers, brake mechanism connected to the opposite ends of said levers, means for energizing said solenoids alternately, an electric controller having two series of resistance-coils, one series being connected with one of said solenoids and the other series with the other solenoid.

5. In an electric brake, the combination of two series of solenoids disposed in pairs, the solenoids of each pair being apart from each other, pistons having their opposite ends disposed in said solenoids, a cross-head connecting said pistons between the series of solenoids, a guide for said cross-head, two levers fulcrumed at corresponding ends, one to said cross-head and the other to a stationary pivot, a link connecting said levers, brake mechanism connected to the opposite ends of said levers, and means for energizing each series of solenoids alternately for applying or releasing the brakes.

6. An electric brake mechanism comprising a supporting-frame, a plurality of solenoids disposed in pairs in said frame, and having pistons operating therein, a cross-head disposed between said solenoids and attached to said pistons, rods disposed in alinement in said frame, sleeves extending centrally in opposite directions from said cross-head and adapted to slide on said rods and serve as a guide for the cross-head, a lever pivoted to said cross-head, a lever pivoted to said supporting-frame, a rod connecting said levers, mechanism connecting said levers with the brakes, and means for energizing said solenoids alternately for applying or releasing the brakes.

7. The combination of two solenoids, guide-rods parallel therewith, a cross-head disposed between said solenoids and provided with sleeves extending in opposite directions and engaging said rods, a lever pivoted to said cross-head in line with said guide-rods, mechanism connected with said lever and actuated thereby, and means for energizing said solenoids alternately.

8. The combination of a cross-head, solenoids disposed on opposite sides thereof, pistons extending from said cross-head into said solenoids, a lever fulcrumed to said cross-head, a guide for said cross-head disposed in line with the pivotal connection of said lever with the cross-head, and means for energizing said solenoids alternately.

In testimony whereof I have signed my name to this specification, in the presence of two subscribing witnesses, on this 10th day of April, A. D. 1899.

GEO. D. BURTON.

Witnesses:
ROCKWOOD PUFFER,
FRANK G. PARKER.